United States Patent Office 2,812,963
Patented Nov. 12, 1957

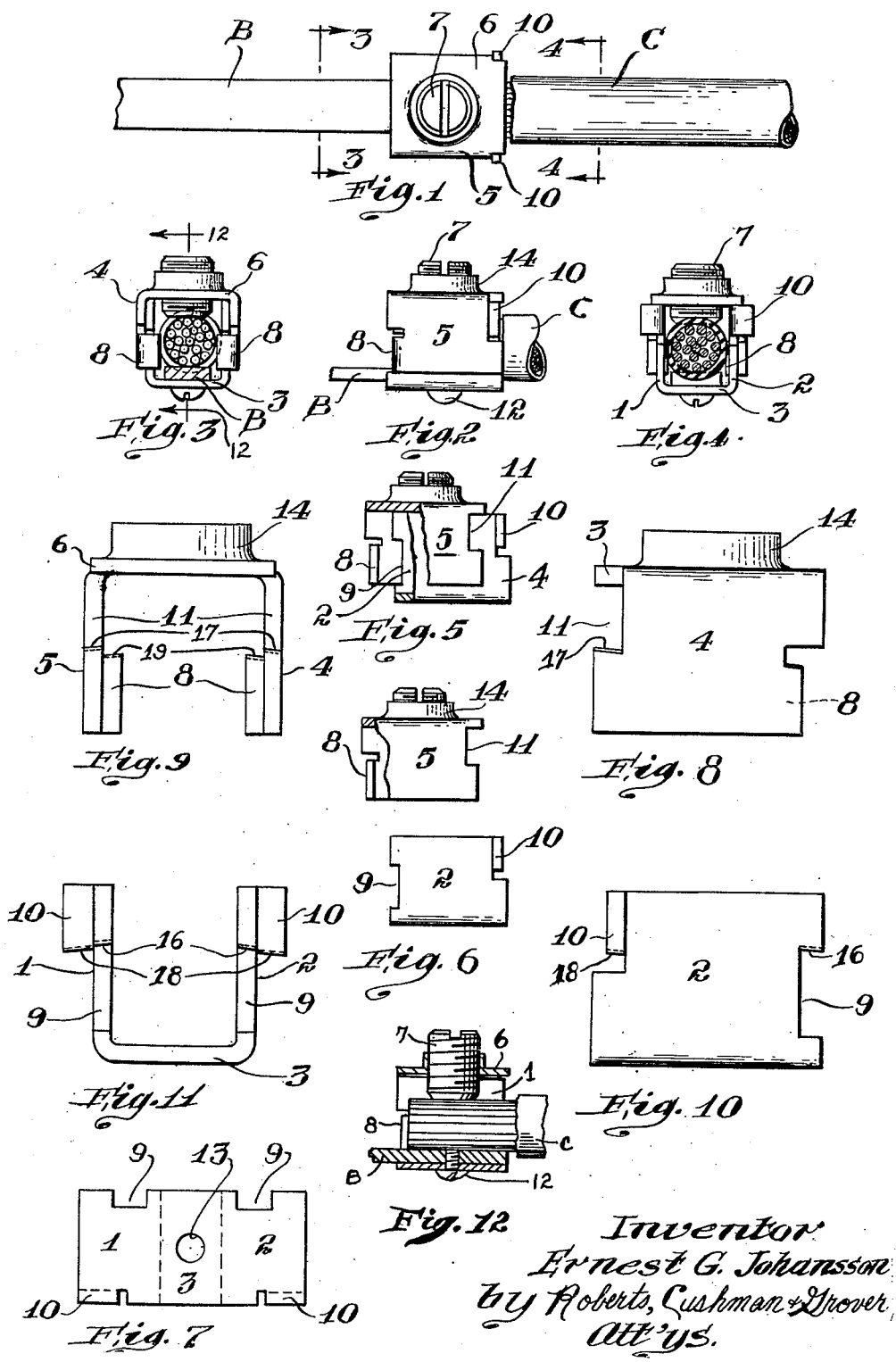

2,812,963
SOLDERLESS CONNECTOR

Ernest G. Johansson, Belmont, Mass., assignor to Anchor Manufacturing Company, Boston, Mass., a corporation of Massachusetts Application December 29, 1953, Serial No. 400,957

6 Claims. (Cl. 287—111)

This invention relates to so-called solderless connectors for connecting together wires, cables, rods, bars and other elongate elements, and has for its objects the provision of a connector which is simple and economical to produce, which is adapted to be made in any size, which can be assembled and disassembled quickly and easily, which can be used in restricted spaces, which permits the elements to be dropped in sidewise through a wide mouth in contradistinction to endwise insertion into a restricted opening, which automatically centers the elements, which clamps the elements throughout their entire width and which is durable and reliable in use.

According to the present invention the connector comprises two channel members each having legs interconnected by a base, one member having sliding movement over the other member lengthwise of the channels with the legs directed in opposite directions and the members having shoulders which move behind each other at the end of the sliding movement to interlock the members against separation crosswise of the bases, and means on one base for clamping the cable or other element against the other base after the members have been interlocked as aforesaid. Preferably the shoulders are in the form of ears and recesses on the legs at the ends of the channels, in which case the members may slide crosswise after they have been moved lengthwise far enough to disengage the ears from the recesses. In the preferred embodiment certain of the abutting surfaces of the ears and recesses are inclined crosswise of the channels and certain of the abutting surfaces are inclined lengthwise of the channels so that, when the clamping means is tightened, the legs of the outer member are cammed inwardly against the legs of the inner member and the ears are cammed into the recesses.

For the purpose of illustration typical embodiments of the invention are shown in the accompanying drawings in which Fig. 1 is a plan view of a connector interconnecting a bar and cable;

Fig. 2 is a side elevation of the same assembly;

Fig. 3 is a section on line 3—3 of Fig. 1;

Fig. 4 is a section on line 4—4 of Fig. 1;

Fig. 5 is a side elevation of the assembly with the two channels slipped lengthwise of each other far enough to disengage the ears from the recesses and with parts broken away;

Fig. 6 is like Fig. 5 except in that the channels have been moved crosswise of each other to disengage one from the other:

Fig. 7 is a plan view of the blank from which the inner channel is made;

Fig. 8 is a side view of a modified outer channel having inclined abutting surfaces;

Fig. 9 is a view from the left end of Fig. 8;

Fig. 10 is a side elevation of the modified inner channel; and

Fig. 11 is a view from the right-hand end of Fig. 10.

Fig. 12 is a view of Figure 3 on line 12—12.

The particular embodiment of the invention shown in Figs. 1 to 7 inclusive comprises an inner channel having upwardly directed legs 1 and 2 interconnected by a bottom base 3, an outer channel member comprising downwardly directed legs 4 and 5 interconnected by a top base 6 and a screw 7 for clamping together the ends of one or more elongate elements such as a bar B and a cable C. At one end the outer channel has inturned ears 8 seating in recesses 9 in the corresponding end of the inner channel, and at the other end the inner channel has outturned ears 10 fitting in recesses 11 in the legs of the other channel. To disconnect the bar and cable the screw 7 is first loosened, the outer channel is then slipped lengthwise of the inner channel far enough to disengage the ears from the recesses as shown in Fig. 5, and then the top channel may be lifted upwardly from the bottom channel as shown in Fig. 6. To interconnect the elements these movements are reversed. Thus the connector can be applied in a restricted space because the parts may be unlocked from each other by only a short movement lengthwise of the channels.

If desired the bar B may be anchored to the base 3 by means of a screw 12 extending through an opening in the base and threading into the bar. This is particularly desirable when using the connector in meter boxes and the like where the bar B is a permanent part of the box. By thus connecting the bottom channel to the bar it is held in fixed position while manipulating the top channel.

Fig. 7 illustrates a blank for use in making the inner channel where 13 is an opening to receive the screw 12, the blank being bent along the broken lines to form the channel. The outer channel can be formed from a similar blank by bending the metal outwardly around the opening 13 to form the boss 14.

The modification shown in Figs. 8 to 11 is similar to the embodiment shown in Figs. 1 to 7, except in that the abutting surfaces of the ears and recesses are inclined so that, when the clamping screw 7 is tightened, the legs of the outer channel are cammed inwardly against the legs of the inner channel and the ears of both channels are cammed into the recesses lengthwise of the channels. Thus the abutting surfaces 16 of the recesses 9 of the inner channel members inclined upwardly away from its base 3 toward the opposite end of the member (Fig. 10) and the abutting surfaces 17 of the recesses 11 of the outer channel member incline downwardly away from its base 5 toward the opposite end of the member (Fig. 8) so as to urge the ears into the recesses in response to the clamping action of screw 7; and the abutting surfaces 18 of the outturned ears 10 of the inner channel member incline inwardly away from its base 3 (Fig. 11) and the abutting surfaces 19 of the ears 8 of the outer member inclines outwardly away from its base 6 (Fig. 9) so as to draw the legs 4 and 5 of the outer member inwardly against the legs 1 and 2 of the inner member in response to the clamping action of the screw 7.

It should be understood that the present disclosure is for the purpose of illustration only and that this invention includes all modifications and equivalents which fall within the scope of the appended claims.

I claim:

1. For connecting a cable or other elongate element to another part, a connector comprising inner and outer members each having legs interconnected by a base to form a channel therein, the outer member having sliding movement over the inner member lengthwise of the channels with the legs directed in opposite directions, the members when connected forming a cableway open at the ends, at one end of the cableway the outer member having ears extending inwardly into recesses in the inner member and at the other end of the cableway the inner member having ears extending outwardly into recesses in the outer member, the ears entering said recesses in response to said movement, the ears and recesses having abutting surfaces which obstruct separation of the members lengthwise of the legs, and clamping means on one base for urging said surfaces into abutting relationship.

2. A connector according to claim 1 further characterized in that said ears are disposed in planes extending crosswise of the cableway so as to bear on the sides of the recesses edgewise.

3. A connector according to claim 2 further characterized in that said members comprise sheet metal bent to form said ears.

4. A connector according to claim 1 further characterized in that the abutting surfaces of the ears of the inner member incline inwardly away from its base and the abutting surfaces of the ears of the outer member incline outwardly away from its base, thereby to urge the legs of the outer member inwardly in response to said clamping means.

5. A connector according to claim 1 further characterized in that the abutting surfaces of the recesses of each member incline away from its base toward the opposite end of the cableway so as to urge the members in the direction of said movement in response to the clamping means.

6. A connector according to claim 1 further characterized in that the abutting surfaces of the ears of the inner member incline inwardly away from its base and the abutting surfaces of the ears of the outer member incline outwardly away from its base so as to urge the legs of the outer member inwardly in response to said clamping means and the abutting surfaces of the recesses of each member incline away from its base toward the opposite end of the cableway so as to urge the members in the direction of said movement in response to the clamping means.

References Cited in the file of this patent

UNITED STATES PATENTS

| | | |
|---|---|---|
| 1,488,967 | Wilson | Apr. 1, 1924 |
| 2,057,329 | Duff | Oct. 13, 1936 |
| 2,114,188 | Johansson | Apr. 12, 1938 |
| 2,265,911 | Landmeier | Dec. 9, 1941 |

FOREIGN PATENTS

| | | |
|---|---|---|
| 512,701 | Great Britain | Sept. 22, 1939 |
| 698,859 | Germany | Nov. 19, 1940 |
| 888,909 | France | Sept. 20, 1943 |